Patented Feb. 22, 1927.

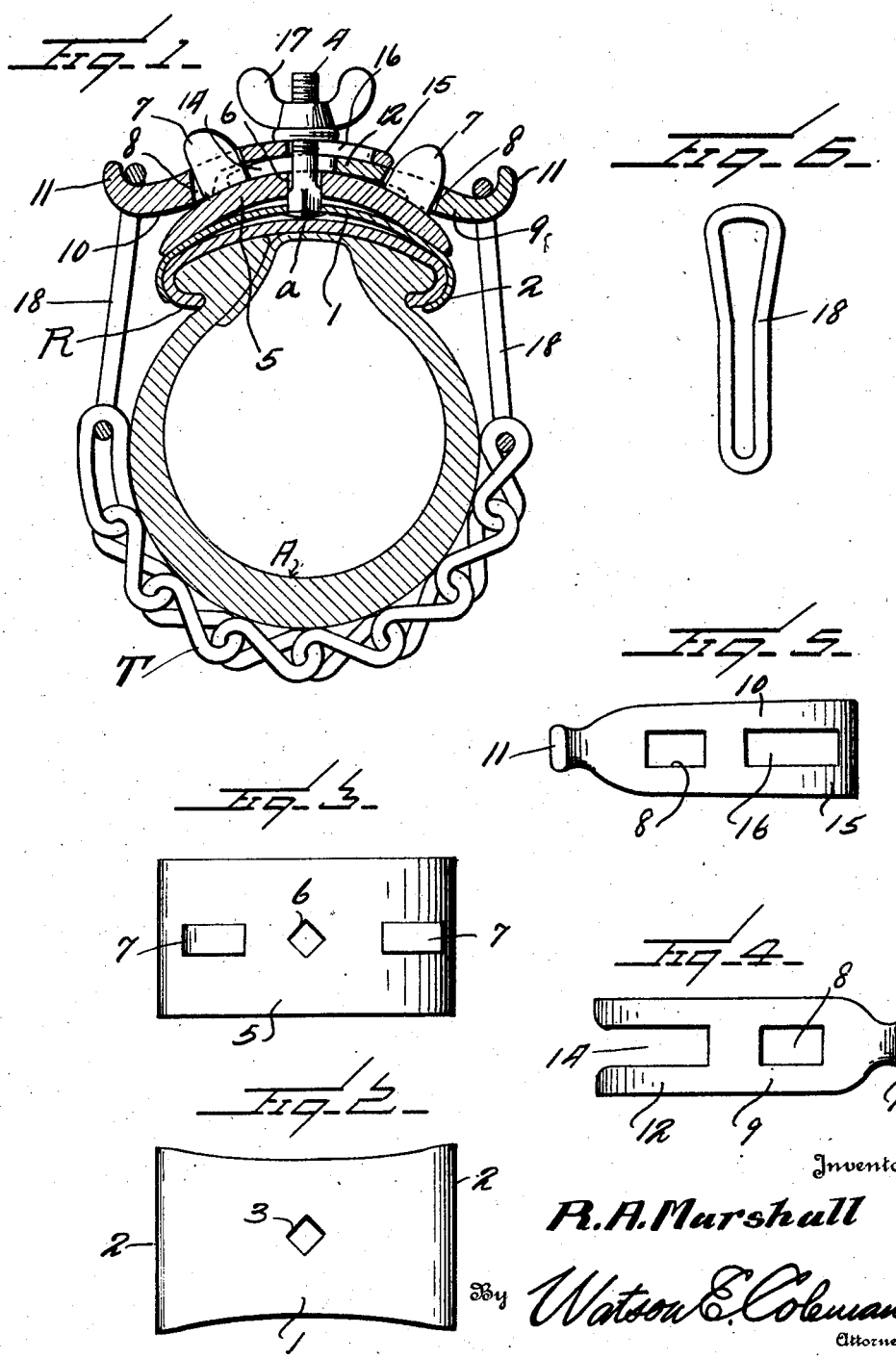

1,618,938

UNITED STATES PATENT OFFICE.

RUSSELL A. MARSHALL, OF DUQUESNE, PENNSYLVANIA.

NONSKIDDING DEVICE.

Application filed January 6, 1926. Serial No. 79,560.

This invention relates to non-skidding devices and it is an object of the invention to provide a device of this kind which may be readily applied and effectively maintained in working position without requiring the use of side chains as now generally employed.

Another object of the invention is to provide a device of this kind employing a tread member together with means carried by the wheel body engageable with the extremities of the tread member to maintain the same in working position, said connecting means and tread member being so constructed that upon severance of the tread member, such tread member will be readily freed from the wheel incident to the centrifugal force created while the wheel body or structure is in motion.
An additional object of the invention is to provide a device of this kind embodying means adapted to be operatively engaged with the rim of a wheel from within for holding a tread member in applied position, said means being of a character whereby upon a single operation the same is effectively held to the rim and at the same time creates additional tension on the tread member to further assure requisite maintenance of said tread member in working position.

The invention consists in the details of construction and in the combination and arrangement of the several parts of my improved non-skidding device whereby certain important advantages are attained and the device rendered simpler, less expensive and otherwise more convenient and advantageous for use, as will be hereinafter more fully set forth.
The novel features of my invention will hereinafter be definitely claimed.

In order that my invention may be the better understood, I will now proceed to describe the same with reference to the accompanying drawing, wherein:—

Figure 1 is a view partly in section and partly in elevation illustrating a non-skid device constructed in accordance with an embodiment of my invention and in applied position;

Figure 2 is a view in top plan of the resilient plate as illustrated in Figure 1;

Figure 3 is a view in top plan of the body member as shown in Figure 1;
Figure 4 is a view in top plan of one of the rock plates herein embodied;

Figure 5 is a view in top plan of the second rock plate as herein employed; and

Figure 6 is a view in side elevation of one of the elongated end links comprised in the tread member.

While the accompanying drawing illustrates but a single non-skidding unit it is to be understood that in practice as many may be employed as desired.

As herein disclosed, my improved non-skidding device comprises an arcuate plate 1 preferably of steel possessing a certain degree of inherent resiliency, and which is provided at its extremities with the transversely disposed flanges 2 adapted to engage with the side marginal portions of the rim R. The construction of the plate 1 together with its flanges 2 is such that when initially applied it has at its end portions close contact with the rim. It is also to be understood that this plate 1 when in working position extends transversely of the rim R across the inner face thereof.

At substantially its axial center the plate 1 is provided with an opening 3 through which is extended the shank of a bolt 4, the head $a$ of said bolt, when the plate 1 is in applied position, being interposed between said plate 1 and the rim R.

A body member 5 of fixed formation and preferably formed of metal is arranged for coaction with the plate 1, said member 5 being disposed on a different radius from that of the curvature of the plate 1 with the end portions of the body member 5 having direct contact with the extremities of the plate 1 at points immediately adjacent to the flanges 2. This body member 5 at substantially its axial center is also provided with an opening 6 through which the shank of the bolt 4 is directed.

The body member 5 at predetermined points inwardly of its opposite ends is provided with the outstanding lugs 7, said lugs substantially radiating from the body member and having their outer end portions rounded. Each of these lugs 7 is adapted to be extended through an opening 8 provided in a plate 9 or 10. These plates 9 and 10 when in applied position are substantially in alignment and are disposed lengthwise of the body member 5 and each of these plates 9 or 10 outwardly of its coacting lug 7 is provided with an arcuate extension or bill 11 transversely reduced with respect to the width of the plate. This extension or bill 11 is substantially a one quarter circle and has its free extremity disposed in a direction inwardly of the wheel structure or body.

The plate 9 is provided with a tail extension 12 disposed longitudinally on such curvature as to have substantially close contact at all points with the body member 5, the free or outer end portion of said tail extension having a longitudinally directed open slot 14 through which the shank of the bolt 4 is also directed. The plate 10 is also provided with a tail extension 15 having in its outer or free end portion a longitudinally directed slot 16 through which the shank of the bolt 4 is adapted to be disposed. This tail extension 15 is arranged longitudinally on a curvature to permit close contact therewith of the tail extension 12. In the assembly as herein disclosed, the tail extension 15 is arranged outwardly of the tail extension 12.

A wing nut 17 or the like is threaded upon the shank of the bolt 4 outwardly of the tail extension 15 and as it is turned into contact with said tail extension 15, both of said tail extensions 15 and 12 will be moved inwardly toward the body member 5 and at the same time pull will be exerted upon the central portion of the plate 1 resulting in the flanges 2 of the plate 1 having effective gripping action upon the rim R, and at the same time bringing the extremities of the body member 5 into tight contact with the plate 1 adjacent to its flanges 2 whereby displacement of the device in its entirety is effectively prevented and especially against the blows to which the device may be subjected when the wheel body or structure is in transit.

The tread member T herein employed is of a conventional link chain type except that the end links 18 are elongated so as to lie substantially close to the side walls of the tire A and thereby occupying a minimum of space. These end links 18 are adapted to be engaged with the arcuate extensions or bills 11. By the use of these end links 18 I provide a non-skid device which is especially adapted for use in connection with motorcycles as these end links 18 permit the use of the device with the elimination of the liability of the tread member T coming into contact with a wheel fender or other adjacent portion of the cycle.

It is to be understood that initially the tread member T is made of a length for use in connection with a tire of a particular size and in applying the member T, the wing nut 17 or the like is adjusted outwardly of the shank of the bolt 4 so that the outer portions of the plates 9 and 10 may be rocked or swung in a direction outwardly of the rim. As is believed to be obvious, this will facilitate the proper engagement of the end links 18 with the arcuate extensions or bills 11. After the tread member has been properly engaged with these arcuate extensions or bills, the wing nut 17 or the like is turned home for contact with the tail extension 15 resulting in the operation hereinbefore referred to.

While I have hereinbefore specifically stated that my improved device is particularly adapted for use in connection with motorcycles, it is to be understood that it can be employed with equal facility in connection with vehicles of other types.

A further and particular advantage of my device as herein disclosed resides in the fact that in the event the tread member T should be severed as a result of wear or any other cause, the same will readily disengage from its coacting extension or bill 11 and be thrown off as a result of the centrifugal force created by the wheel body or structure when in motion. By this beneficial action, it is assured that the wheel fender or other adjacent portion of the motorcycle or other vehicle will not be subjected to the blows from said separated portions nor will there be liability of such severed portions becoming entangled in the wheel structure or body or otherwise as may result in injury either to the vehicle or to the driver.

From the foregoing description it is thought to be obvious that a non-skidding device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with the rim of a wheel, a body member disposed across the internal face of said rim, means for securing said body member to the rim, plates, means for connecting said plates with the body member for rocking movement in a direction lengthwise of the body member, the means for holding the body member to the rim also operating to hold the plates against swinging movement, and a tread member engageable with said plates.

2. In combination with the rim of a wheel, a body member carried by said rim and disposed across the internal face thereof, plates arranged at the opposite ends of said body member, means for securing the plates to the body member for rocking movement, and means carried by the body member and coacting with the plates for holding the same against such rocking movement, and a tread member engageable with the plates.

3. In combination with the rim of a wheel, a body member carried by said rim and disposed across the internal face thereof, plates arranged at the opposite ends of said body member, means for securing the plates to the body member for rocking movement, means carried by the body member and coacting with the plates for holding the same against such rocking movement, said plates being provided with inwardly disposed bills, and a tread member having its extremities freely engageable with said bills.

4. In combination with the rim of a wheel, a body member carried by said rim and disposed across the internal face thereof, plates arranged at the opposite ends of said body member, means for securing the plates to the body member for rocking movement, means carried by the body member and coacting with the plates for holding the same against such rocking movement, said plates being provided with inwardly disposed bills, and a tread member having its extremities freely engageable with said bills, each of said bills being disposed on a curvature of substantially one quarter of a circle.

5. In combination with the rim of a wheel, a body member disposed across the internal face of said rim and carried thereby, outstanding lugs carried by said body member at points spaced lengthwise thereof, plates, each of said plates having an opening through which one of the lugs extends, said plates having overlying tail extensions, said extensions being provided with slots, a shank extending outwardly from the body member and disposed through the slots of the tail extensions, a member engaging the shank outwardly of the tail extensions and having movement toward and from the tail extensions, and a tread member engageable with the plates.

6. In combination with the rim of a wheel, a plate disposed across the internal face of the rim and having its extremities engaged with the rim, said plate possessing inherent resiliency, a body member extending lengthwise of this plate and having its end portions in direct contact with the plate, said body member having its intermediate portion spaced from the the intermediate portion of the plate, an outstanding shank carried by the plate and freely disposed through the body member, a clamping nut threaded upon the shank, a tread member, and means for engaging the tread member with the opposite ends of the plate.

7. In combination with the rim of a wheel, a plate disposed across the internal face of the rim and having its extremities engaged with the rim, said plate possessing inherent resiliency, a body member extending lengthwise of this plate and having its end portions in direct contact with the plate, said body member having its intermediate portion spaced from the intermediate portion of the plate, an outstanding shank carried by the plate and freely disposed through the body member, a clamping nut threaded upon the shank, a tread member, and means for engaging the tread member with the opposite ends of the plate, said body member being rigid.

In testimony whereof I hereunto affix my signature.

RUSSELL A. MARSHALL.